Jan. 2, 1962        R. C. COBLENTZ        3,015,216

AIR CONDITIONING SYSTEM

Filed March 25, 1957        2 Sheets-Sheet 1

INVENTOR.
Robert C. Coblentz
BY
Ralph Hammar
Attorney

United States Patent Office 3,015,216
Patented Jan. 2, 1962

3,015,216
AIR CONDITIONING SYSTEM
Robert C. Coblentz, 1226 W. 9th St., Erie, Pa.
Filed Mar. 25, 1957, Ser. No. 648,307
14 Claims. (Cl. 62—180)

This invention is intended to improve the control of air conditioning systems. Under all loads, both the room temperature and humidity are controlled primarily by the cooled air temperature and the air flow is controlled by the duct air pressure. By controlling the duct air pressure, cutting off the flow through one or more outlets does not cause whistling of the air through the remaining outlets. This is important in multiple outlet systems such as used in hotels where preference for individual room temperature changes with each occupant. To prevent fluctuation of room humidity, it is desirable that there be more than one setting for the internal or cooled air temperature. Under heavy load, the cooled air temperature is set lower than under light load, thereby obtaining frequent enough operation of the unit to prevent fluctuation of the room humidity. The setting of the cooled air temperature can be under the control of the room thermostat.

Figure 1:
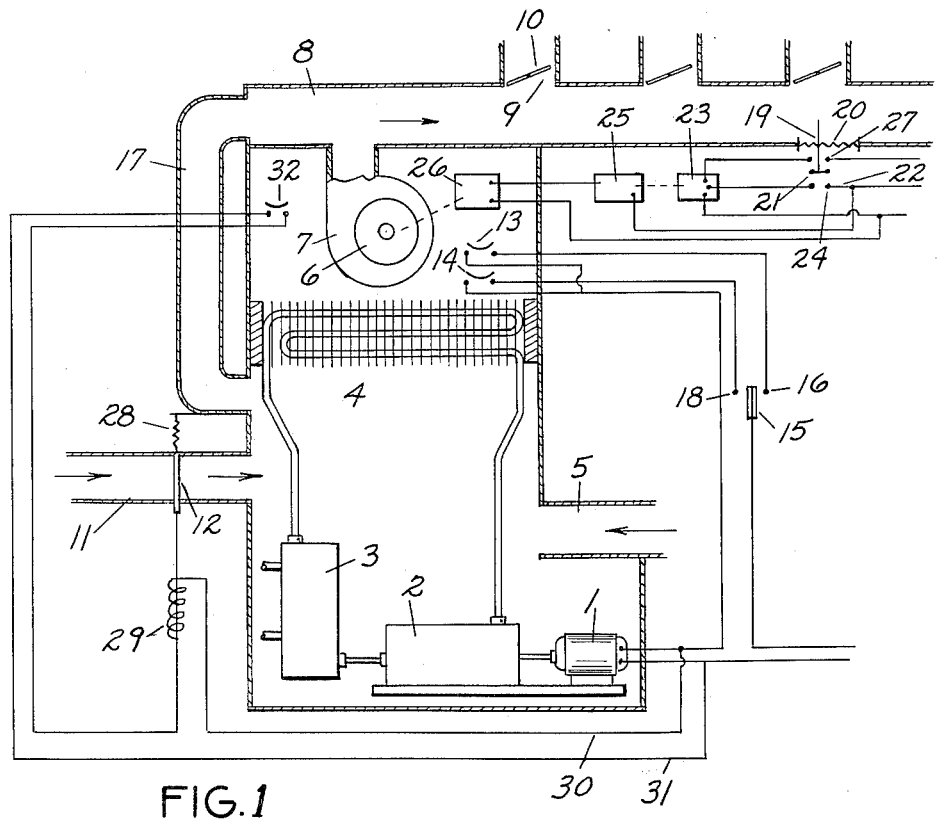
Figure 2:
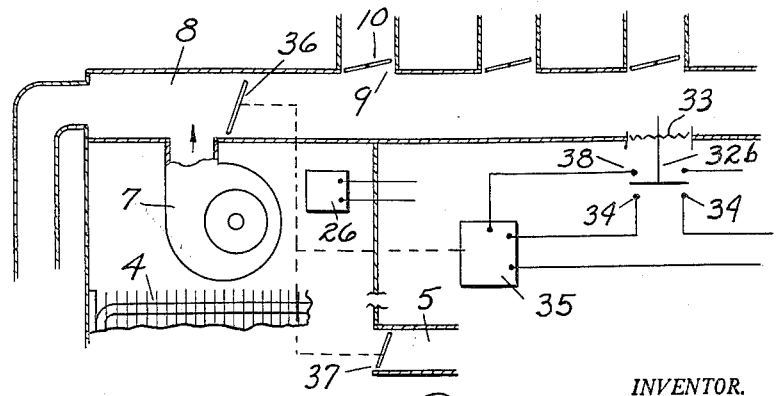
Figure 3:
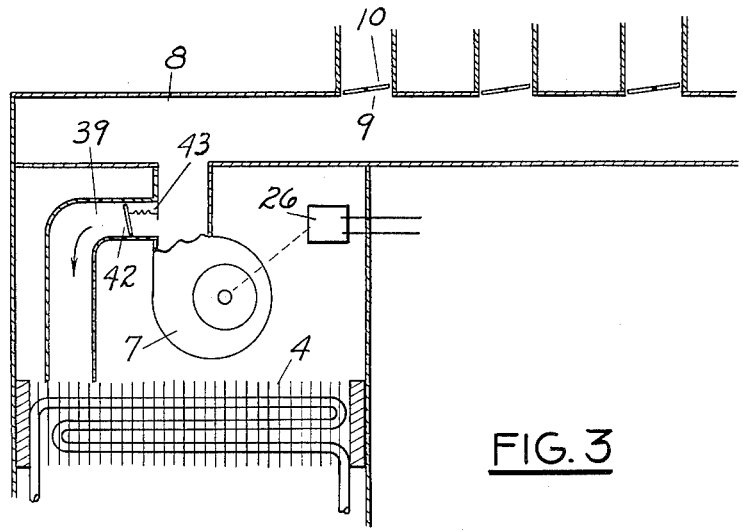
Figure 4:
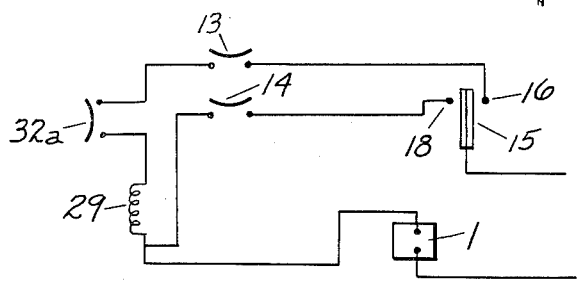
Figure 5:
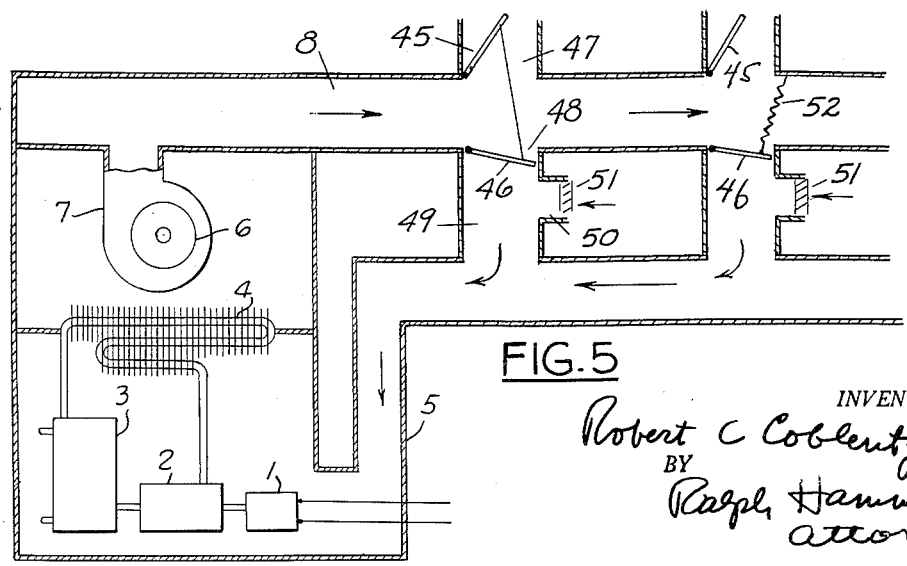

In the drawings, FIG. 1 is a diagrammatic view of an air conditioning system; FIG. 2 is a fragmentary view of a modification which may be substituted in FIG. 1; FIG. 3 is another modification which may be substituted in FIG. 1; FIG. 4 is a fragmentary control diagram which confines the fresh air intake to the first stage of cooling; and FIG. 5 shows a damper control which eliminates whistling.

The conventional parts of the air conditioning system are readily identified, 1 being the driving motor, 2 the compressor, 3 the condenser and 4 the evaporator or cooling coil. The return air is fed into the unit through a duct or grill 5 and flows over the cooling coil 4 to the inlet 6 of a fan 7 which discharges to an outlet duct 8 having a plurality of outlets 9 controlled by dampers 10. Fresh air is fed to the inlet side of the cooling coil through a duct 11 controlled by a damper 12. The parts so far described are or may be of common construction and may differ substantially in appearance and arrangement from that shown in the drawing.

The primary control for both the room temperature and humidity is by internal thermostats 13 and 14 responsive to the cooled air temperature. The thermostat 13 is set for a higher temperature than the thermostat 14. In a practical installation, the thermostat 13 might have its upper limit at 80 degrees and its lower limit at 56 degrees while the thermostat 14 might have its upper limit at 60 degrees and its lower limit at 45 degrees. The 80 degree upper limit for the thermostat 13 corresponds to the desired maximum air temperature. The 45 degree lower limit for the thermostat 14 is sufficiently above freezing to prevent frosting of the evaporator or cooling coil 4. If the upper limit of the thermostat 13 is set too high, the room will not be adequately cooled while if it is set too low, the room will become too cold as the thermostat 13 is in effect the primary control for the room temperature. The important setting for the thermostat 14 is the low limit because if the low limit is too low, the evaporator or cooling coil will frost. The ranges between the upper and lower limits of the thermostat 13 and 14 are not critical. These are selected to prevent too frequent operation of the refrigerating unit.

Either the thermostat 13 or the thermostat 14 controls the refrigerating unit depending on the cooling load as reflected by a room air thermostat 15. When the cooling load is light as indicated by a low room temperature, for example below 80 degrees F., the thermostat 15 closes on contact 16 and connects the thermostat 13 in series with the motor so that the refrigerating unit turns on when the cool air temperature rises to the upper limit and turns off when the cooled air temperature drops to the lower limit of the thermostat 13. This is satisfactory for light load conditions and results in frequent enough operation of the refrigerating unit so that the room humidity does not have a chance to build up when the refrigerating unit is shut down due to fresh air supplied through the fresh air duct 11. While it might be thought that this result would be obtained with the conventional room thermostat control which ordinarily works on about a 1 degree differential, in actual practice that has not proven to be the case. Under light load conditions with the conventional control, when the refrigerating unit need operate for example only one third of the time in order to maintain the desired temperature level, a typical air conditioning unit would operate for twenty minutes and then shut down for forty minutes. Since the fan 7 runs continuously during all of the forty minute shut down, an appreciable amount of fresh air will come in through the fresh air duct 11 during the shut down period and the humidity will have a chance to rise. Accordingly, while the conventional air conditioning system will maintain the room temperature quite constant, the humidity will be subject to wide fluctuation. With applicant's system under the same conditions the cooled air drops to the operating point of thermostat 13 much quicker than the room air temperature would drop to the operating point on the conventional room thermostat. The reason this is possible is that the room includes a large volume of space while the space within the air conditioning unit is quite small and the air within that confined smaller space can be cooled much more quickly than the air in the room. This is particularly true if there is a recycling duct 17 leading from the discharge side of the fan 7 back to the intake side of the cooling coil 4. Recycling through the duct 17 causes even more rapid cooling of the air flowing over the cooling coil because on the average the air has more than one pass over the coil.

When the air conditioning load is high, the room air temperature tends to rise and upon rising slightly above 80 degrees the room thermostat 15 closes on contact 18 in series with the thermostat 14. This transfers the control of the refrigerating unit from the thermostat 13 to the thermostat 14 so that now the cooled air discharged into the duct 8 has a lower temperature and accordingly has the lower moisture content desirable to decrease the room humidity under the heavy load conditions. In a typical system when the room temperature is below 80 degrees, the thermostat 15 would close on contact 16 while at room temperatures slightly above 80 degrees the room thermostat would close on contact 18. When operating under the control of the thermostat 14, the cooled air discharged to the duct system 8 will have a moisture content corresponding to a dew point of on the average of about 50 degrees. This limits the moisture content of the air in the room to between 40 and 60 grains per pound of dry air which corresponds to the moisture content desirable for maximum comfort.

From one aspect, the thermostats 13 and 14 effect two stage cooling. Under light loads, the air conditioning unit is controlled by the thermostat 13 which causes cooling of the air only to a relatively slight extent thereby providing the first stage of cooling. Under heavy loads, the unit is controlled by the thermostat 14 which causes cooling of the air to a much greater extent and thereby provides the second stage of cooling.

In this system, the room thermostat 15 does not control the air conditioning unit. Whether the air conditioning unit is on or off depends upon the thermostats 13 or 14. For example, if the room air temperature were 81 degrees, as it might be on a hot day when the cooling load was high, the room thermostat 15 would be closed on contact 18 thereby connecting the motor 1 of the air conditioning unit in series with the thermostat 14. So long as the thermostat 15 was closed on contact 18, the sole control of the motor would be by the thermostat 14 which would close the circuit to the motor at its upper limit of 60 degrees and open the circuit to the motor at its lower limit of 45 degrees. The on-off operation of the thermostat 14 has a modulating effect which prevents wide fluctuations in the room air temperature. The room air temperature would drift upward from 81 degrees as the cooling load increased and would drift downward from 81 degrees as the cooling load decreased. The drift in room air temperature would be very slow during the major portion of the air conditioning season when substantial air conditioning is required. However, when little or no air conditioning is required, continued operation under the sole control of thermostat 14 would result in the room temperature drifting down too low for comfort. To prevent this, when the room temperature reaches, for example, 79 degrees, the room thermostat 15 closes on contact 16 thereby connecting the thermostat 13 in the circuit of the air conditioning unit motor 1. Under these conditions, the air conditioning load is light and little or no operation of the air conditioning unit is required. The thermostat 13 is accordingly set to turn on when the cooled air temperature rises to 80 degrees and to turn off when the cooled air temperature drops to 56 degrees. If the cooled air temperature does not rise to 80 degrees, then the air conditioning unit does not come on because no air conditioning is required. When the room air temperature rises to 80 degrees, the thermostat 13 turns the air conditioning unit on and it remains on until the cooled air temperature drops to 56 degrees. With the air conditioning unit operating on a cooled air temperature range of 80 degrees-56 degrees, it does not exert a high degree of cooling which is desirable under conditions where little or no cooling is required. As the air conditioning load increases, operation of the air conditioning unit under the control of thermostat 13 will be inadequate and the room temperature will drift upward. When the room air temperature rises to 81 degrees, the room air thermostat closes on contact 18 thereby putting the unit under the control of thermostat 14 and obtaining the greater cooling needed for heavy load conditions. Under all conditions, whether the air conditioning unit is on or off depends upon the cooled air temperature and not upon the room air temperature. The room air temperature thermostat 15 merely selects the cooling output range for the unit.

It is not always necessary to use two stages of cooling. A single stage controlled by thermostat 14 has been found to be satisfactory in many installations, particularly when the recycling duct 17 is used. However, for applying the control to existing installations, the ability to use the two stage cooling provided by thermostats 13 and 14 is very desirable since it smooths out the fluctuations in humidity control for any system without requiring any changes in the duct work.

The two stage cooling provided by thermostats 13 and 14 is desirable in both single outlet and multiple outlet systems.

In multiple outlet systems such as used in hotels where each room must be capable of being cooled to the lowest desired temperature and where the preferences for room temperature change from day to day with different occupancy, the only presently available control has been to provide each outlet 9 with a manually controlled damper 10. As the dampers 10 are shut to decrease the cooling in some rooms, the air pressure builds up in the duct system causing whistling of the air at the other outlets 9 so that after a few of the dampers 10 have been shut to cut off the cooling, other dampers will be shut to stop the whistling even though the cooling is otherwise ordered.

In order to prevent whistling, at a suitable point in the duct 9 is arranged a pressure switch 19 having a diaphragm 20 subject to the duct air pressure and controlling contacts 21 in a line 22 feeding a motor 23. Whenever the duct air pressure rises too high, the contacts 21 close on contacts 24 and cause the motor 23 to turn the speed control at 25 in the direction to slow down the motor 26 which drives the fan 7. Whenever the duct air pressure drops too low, the contacts 21 close on contacts 27 and cause the motor 23 to turn the speed control at 25 in the direction to increase the speed of the motor 26. Instead of controlling the motor speed, the same effect could be obtained by a variable speed drive between the motor and fan. Accordingly the pressure switch 19 maintains the air pressure within the duct 8 at the value needed to supply the outlets 9, but keeps it from rising to a value high enough to cause whistling. The pressure switch 19 is effective all of the time because the fan 7 runs all of the time for ventilation purposes even though the refrigerating unit may be shut off. Of course, changing the speed of the fan 7 changes the heat transfer relation between the incoming air and the cooling coil 4. However, because of the internal control provided by the thermostats 13 and 14, these changes cannot cause frosting of the cooling coil 4 which might otherwise take place if the fan speed were cut too low. Whenever the pressure switch is applied to an existing installation, particularly an installation which does not have the recycling duct 17 or its equivalent, an internal or cooled air thermostat such as shown at 13 or 14 should be used.

The fresh air duct 11 is shown controlled by a damper 12 biased to the open position by a spring 28 and pulled to the closed position by a solenoid 29. The solenoid 29 is connected by conductors 30 and 31 across the terminals of the compressor motor 1 so that the solenoid can be energized only when the compressor is running. When the compressor 1 runs, the cooling coil 4 is cold and the moisture in the outside air is at least partially removed before it can enter the duct system. If fresh air were admitted during periods when the compressor motor were shut down, it would be possible for moist, warm, outside air to enter the duct system and to give up its moisture within the duct system instead of within the air conditioning unit. Condensation of moisture within the duct system is undesirable as there usually are no provisions for drainage as there are within the air conditioning unit. In order to still further insure against the unwanted condensation of moisture from outside air, there may be arranged on the downstream side of the cooling coil 4 a thermostat 32 connected in series with the solenoid 29. The thermostat 32 would permit opening of the damper 12 controlling the fresh air intake only when the temperature of the cooled air on the downstream side of the cooling coil 4 was low enough so as to prevent unwanted condensation in the duct system. The thermostat 32 can also have the additional function of preventing frosting of the cooling coil 4. For this use, the thermostat 32 would be set close to the low limit of the thermostat 14 and would close when the temperature of the cooled air became low enough to run the risk of frost forming on the cooling coil 4. The closing of the thermostat 32 under these conditions would introduce warm outside air which would provide the fresh air for ventilation purposes and at the same time raise the temperature of the cooled air leaving the cooling coil 4 to a value sufficient to prevent frost formation. The preventing of frost formation on the evaporator is very important in air conditioning systems because the rate of heat transfer drops very suddenly as soon as the frost formation starts and unless the frosting condition is quickly stopped, the frost formation is cumulative and causes complete icing of the cooling coil. While defrosting of the cooling coil is possible, it is much better not to allow formation of any frost at all.

In the modification shown in FIG. 2 which is intended for alternative installation in the air conditioning system of FIG. 1 the parts common to FIGURE 1 will be readily identified by the same reference numerals. In this modification, the fan 7 is driven at constant speed by the motor 26. A pressure switch 32b corresponding to the pressure switch 19 is mounted at a convenient point in the duct system 8 where the pressure would truly reflect the average pressure supplied to the outlets 9. When the duct air pressure rises above the desired value the pressure exerted on a diaphragm 33 causes closing of contacts 34 in circuit with a motor 35 controlling either a damper 36 in the duct 8 or a damper 37 in the return duct 5 or both. Closing of the contacts 34 causes the motor 35 to run in the direction to restrict the air flow thereby cutting down the pressure in the duct 8 so as to prevent whistling through the outlets 9. When the duct air pressure drops to too low a value, the reduced pressure on the diaphragm 33 causes closing of contacts 38 which energizes the motor 35 in the direction to open the dampers 36 or 37 as the case may be and thereby allow more air pressure to enter the duct 8 so as to maintain the duct air pressure at the value needed for cooling.

In the modification shown in FIG. 3, which is also intended for substitution in the air conditioning system of FIG. 1, the fan 7 is driven at constant speed by the motor 26. At a suitable point on the discharge of the fan, there is a duct 39 having a damper 42 normally held in the closed position by a spring 43. When the fan pressure rises to a value sufficient to overcome the force of the spring 43, the damper 42 opens and part of the air discharged from the fan flows into the duct 39 leading back to the suction or intake side of the cooling coil 4. The bleeding of air from the fan discharge prevents the building up of excessive pressures within the duct 8, and thereby overcomes the whistling problem. Although it is preferable that the duct 39 be used to return the air to the intake side of the cooling coil 4, the part of the duct beyond the damper can be omitted in which case the air bled from the fan discharge returns to the intake of the fan 7 without being further cooled by passage over the cooling coil 4.

In the modification shown in FIG. 4, which is intended for substitution in the FIG. 1 system, the fresh air intake is confined to periods when the room air temperature is low enough so that the air conditioning unit can carry the additional load imposed by the admission of fresh air. When the room air temperature is cool enough, the room air thermostat 15 closes on the contact 16 thereby connecting the unit so as to be controlled by the thermostat 13. The thermostat 13 is connected in series with the solenoid 29 which controls the fresh air damper 12 and through a low limit room air thermostat 32a to the motor 1. Accordingly, fresh air can be admitted only when the unit is operating and when the room thermostat closes on contact 16 so as to place the control under thermostat 13. The thermostat 13 as previously described is set for relatively high limits, for example, between an upper limit of 80 degrees and a lower limit of 56 degrees so that there is ample refrigerating capacity in the air conditioning unit to accommodate any additional load imposed by the admission of fresh air. The thermostat 32a keeps the room from getting too cold when the outside air temperature is low. When the room air temperature rises, as it will when the air conditioning load increases, the room air thermostat 15 closes on contact 18 thereby placing the air conditioning unit under the control of the lower range thermostat 14. The thermostat 14 is not connected in series with the solenoid 29 so that under this condition the fresh air damper 12 is held continuously closed by the spring 28. While it would be thought that the admission of fresh air would be required both under light load and under heavy load conditions, as a practical matter, the infiltration of fresh air is greatest under heavy load conditions so that the use of the air conditioning unit for cooling exclusively is all that is needed.

Instead of preventing whistling through the outlets by the use of a duct pressure control as shown in FIGS. 1 and 3, the same result can be obtained by the arrangement shown in FIG. 5 where there are tandem connected dampers 45 and 46 associated with each outlet 47 for conditioned air. The damper 45 is connected in the conditioned air duct 8 and adjusts the volume of conditioned air output at each outlet in accordance with individual preference. The damper 46 is associated with a return air outlet 48 connected to the return air duct by a bypass duct 49. The capacity of the bypass duct 49 is substantially the same as the capacity of the outlet 47. The dampers 45 and 46 are so arranged that as the damper 45 opens the outlet 47 the damper 46 closes the outlet 48. When the outlet 47 is being used to full capacity, the outlet 48 is fully closed and no air flows through the bypass duct 49. The return air flows into the return air duct 5 through the usual return air connection 50 which is provided with check dampers 51 which prevent reverse flow when the dampers 46 are opened to admit cooled air to th bypass duct 49. When the damper 45 completely closes the outlet 47, the damper 46 opens the outlet 48 so that air which normally would have flowed through the outlet 47 now flows through the outlet 48 and the bypass duct 49 to the return air duct 5. Accordingly, whether the damper 45 is open or closed, the air flow through the delivery duct 8 will remain the same. This prevents the build up in air pressure at the delivery outlets which causes the whistling. The recirculation of the air through the outlet 48 and the bypass duct 49 does not increase the air conditioning load because the cooled air flowing directly into the return air duct 5 precools the return air and reduces the air conditioning load. The dual damper arrangement, accordingly, completely eliminates the air whistling problem which has heretofore been present in multiple outlet systems with individually controlled dampers without requiring any change in the control system. It is readily installed in multiple outlet systems where the conditioned air and return air ducts are housed within a false ceiling, although it is not limited to this type of installation.

In hotels, it frequently happens that an occupant will shut the damper controlling the incoming cooled air and will open the window. This upsets the system because fresh air is drawn in through the window into the return air duct. Accordingly, by obtaining the desired condition in his room, the occupant penalizes others in adjoining rooms who may wish air conditioning. The dampers 46 and 51 prevent any interferences with adjoining rooms. When the occupant of one room closes the damper 45 cutting off the flow of cooled air, the associated damper 46 is opened and the pressure of the bypassed cooled air shuts the check damper 51 in the normal return air passage from the room. Now, opening windows will have no effect upon the system because the room is completely isolated from the system.

Instead of a mechanical connection between dampers 45 and 46, a similar effect can be obtained by having the damper 46 biased shut by a spring 52. When the associated damper 45 is closed, the rise in duct air pressure overcomes the spring 52 and relieves the pressure by returning the cooled air to the return air duct 5. The spring 52 limits the rise in duct air pressure.

What is claimed as new is:

1. In an air conditioning system having a refrigerating unit supplying a cooling heat exchanger, an inlet for return air, an outlet to a room for cooled air, and a fan for drawing air from the inlet over the cooling heat exchanger and discharging cooled air to the room, the combination of thermostat means responsive to the temperature of the cooled air leaving the heat exchanger turning the unit on when the cooled air temperature rises and shutting the unit off when the cooled air temperature drops, said thermostat means having a plurality of preset operating ranges of higher and lower temperatures, and a room air thermostat for shifting the thermostat means to a lower temperature range as the room air temperature increases.

2. In an air conditioning system having a refrigerating unit supplying a cooling heat exchanger, an inlet for return air, an outlet to a room for cooled air, and a fan for drawing air from the inlet over the cooling heat exchanger and discharging cooled air to the room, the combination of at least two alternatively usable thermostats responsive to the cooled air temperature and having different operating ranges respectively of higher and lower temperature relative to each other any one of which is effective to control the cooled air temperature, and a room air thermostat for connecting the higher range thermostat in control relation as the room temperature falls and the lower range thermostat in control relation as the room temperature rises.

3. In an air conditioning system having a refrigerating unit supplying a cooling heat exchanger, an inlet for return air, an outlet to a room for cooled air, and a fan for drawing air from the inlet over the cooling heat exchanger and discharging cooled air to the room, the combination of thermostat means responsive to the temperature of the cooled air leaving the heat exchanger turning the unit on when the cooled air temperature rises and shutting the unit off when the cooled air temperature drops, the operating range of said thermostat means being adjustable to higher and lower temperatures, and means responsive to the room air temperature for adjusting the operating range of said thermostat means in inverse relation to the change in room temperature.

4. In an air conditioning system having a refrigerating unit supplying a cooling heat exchanger, an inlet for return air, an outlet to a room for cooled air, and a fan for drawing air from the inlet over the cooling heat exchanger and discharging cooled air to the room, the combination of at least two alternatively operable thermostats responsive to cooled air temperature operable to hold the cooled air temperature in different temperature ranges of lower and higher temperatures respectively, and a room air thermostat for connecting the lower temperature range cooled air thermostat in control relation as the room air temperature rises and the higher temperature range cooled air thermostat in control relation as the room air temperature falls.

5. In an air conditioning system having a refrigerating unit supplying a cooling heat exchanger, a duct system for the cooled air having a plurality of outlets for discharge to the areas to be cooled each with its own control for regulating the air flow through it, and a recycling passageway for conducting cooled air from the downstream side of the heat exchanger prior to flow through said outlets to the upstream side of the heat exchanger, fan means for moving air to be cooled over the heat exchanger and forcing the cooled air into the duct system and into the recycling passageway, pressure regulating means for the duct air pressure for diverting cooled air through the recycling passageway as the air flow through the outlets is restricted to maintain the duct air pressure below the value causing whistling, and thermostatic means responsive to the cooled air temperature for controlling the refrigerating unit.

6. In an air conditioning system having a refrigerating unit supplying a cooling heat exchanger, a duct system for the cooled air having a plurality of outlets with controls for regulating the air flow, and a recycling passageway for conducting cooled air from the downstream side of the heat exchanger to the upstream side of the heat exchanger, fan means for moving air to be cooled over the heat exchanger and forcing the cooled air into the duct system and into the recycling passageway, pressure regulating means for the duct air pressure for diverting cooled air through the recycling passageway as the air flow through the outlets is restricted to maintain the duct air pressure below the value causing whistling, thermostatic means responsive to the cooled air temperatures for controlling the refrigerating unit, and a room air thermostat for lowering the operating temperature of the thermostatic means as the room air temperature increases.

7. In an air conditioning system having a refrigerating unit supplying a cooling heat exchanger, a duct system for the cooled air having a plurality of outlets, each outlet having an independently settable control for regulating the air flow through it, fan means for moving air to be cooled over the heat exchanger and forcing the cooled air into the duct system, said fan means having its discharge connected to the duct system and its intake connected to the air flowing over the heat exchanger, a passageway leading from the fan discharge to the fan intake, a spring loaded damper controlling the flow through said passageway and being opened by the fan discharge pressure overcoming the spring loading to limit the build up of the duct air pressure to a value below that causing whistling.

8. In an air conditioning system having a refrigerating unit supplying a cooling heat exchanger, an inlet for return air, an outlet to a room for cooled air, a fresh air intake, and a fan for drawing air from the inlet and fresh air intake over the cooling heat exchanger and discharging cooled air to the room, the combination of a damper for the fresh air intake, a plurality of alternatively operable thermostats for controlling the cooled air temperature and operable at higher and lower temperatures respectively, a room air thermostat for connecting the lower temperature cooled air thermostat in control relation as the room air temperature rises and the higher temperature cooled air thermostat in control relation as the room air temperature falls, and means energized in parallel with the refrigerating unit for shutting the fresh air damper when the refrigerating unit is off and opening the damper when the refrigerating unit is on.

9. In an air conditioning system having a refrigerating unit supplying a cooling heat exchanger, an inlet for return air, an outlet to a room for cooled air, a fresh air intake, and a fan for drawing air from the inlet and fresh air intake over the cooling heat exchanger and discharging cooled air to the room, the combination of a control for the fresh air intake, a control for the refrigerating unit, thermostatic control means for controlling the cooled air temperature and settable to higher and lower operating temperatures, means responsive to the room air temperature for setting the operating temperature of the thermostatic control means in inverse relation to the change in room temperature, and means actuating the control for the fresh air intake to open the same when the refrigerating unit is on and the thermostatic control means is set to the higher operating temperature and for closing the fresh air intake when either the refrigerating unit is off or the thermostatic control means is set to the lower operating temperature.

10. In an air conditioning system having a refrigerating unit supplying a cooling heat exchanger, a duct system for the cooled air having a plurality of outlets supplying separate zones with separate controls for regulating the air flow at the separate zones, a return air duct system, fan means for moving air to be cooled over the heat exchanger and forcing the cooled air into the cooled air duct system, said fan means having its discharge connected to the cooled air duct system and its intake connected to the return air duct system, a bypass duct associated with each outlet leading from the cooled air duct system to the return air duct system, a control for the bypass duct, means interconnecting the control for each outlet with the control for the associated bypass duct for operating the controls in inverse relation to each other whereby upon closing of an outlet the associated bypass duct is opened and the cooled air which would normally have flowed through the outlet is diverted through the associated bypass duct to prevent build up of air pressure in the cooled air duct system, an inlet leading from each of the separate zones to the return air duct system, a damper controlling said inlet, and means utilizing the pressure of the cooled air diverted through said bypass duct to shut the associated damper controlling the inlet to the return air duct system.

11. In an air conditioning system having a refrigerating unit supplying a cooling heat exchanger, a duct system for the cooled air having a plurality of outlets supplying separate zones with separate controls for regulating air flow at the separate zones, a return air duct system, fan means for moving air from the return air duct system over the heat exchanger and forcing the cooled air into the cooled air duct system, a bypass duct associated with each outlet leading from the cooled air duct system to the return air duct system, a control for the bypass duct, an inlet from each of the separate zones to the return air duct system, a control for the inlet, and means interconnecting the control for each outlet with the controls for the associated bypass duct and inlet and for operating the controls in inverse relation whereby upon shutting the outlet for cooled air to one zone the associated inlet is also shut and the associated bypass duct is opened to divert to the return air duct system cooled air which would normally have flowed through said outlet.

12. In an air conditioning system having a refrigerating unit supplying a cooling heat exchanger, a duct system for the cooled air having a plurality of outlets supplying separate zones with separate controls for regulating the air flow at the separate zones, a return air duct system, fan means for moving air from the return air duct system over the heat exchanger and forcing the cooled air into the cooled air duct system, an inlet from each zone to the return air duct system, a control for the inlet, and means for operating the controls for the outlet and inlet in the same direction whereby upon shutting the outlet for cooled air to one zone the associated inlet is also shut to cut off said one zone from the balance of the air conditioning system.

13. In an air conditioning system having a refrigerating unit supplying a cooling heat exchanger, an inlet for return air, an outlet to a room for cooled air, a fresh air intake, a fan for drawing air from the inlet and fresh air intake over the cooling heat exchanger and discharging cooled air to the room, means for recycling part of the cooled air back over the heat exchanger for further cooling before delivery to the room, and a control for turning the unit on and off in accordance with the cooled air temperature, the combination of a damper for the fresh air intake, and a solenoid energized in parallel with the refrigerating unit for shutting the damper when the refrigerating unit is off and opening the damper when the refrigerating unit is on.

14. In an air conditioning system having a refrigerating unit supplying a cooling heat exchanger, an inlet for return air, an outlet to a room for cooled air, and a fan for drawing air from the inlet over the cooling heat exchanger and discharging cooled air to the room, the combination of at least two thermostats for controlling the refrigerating unit, each thermostat being responsive to the cooled air temperature and having respectively higher and lower operating temperature ranges, and means responsive to the room temperature for connecting the lower range thermostat in control relation to the unit as the room temperature rises above a selected temperature and the higher range thermostat in control relation to the unit as the room temperature falls below a selected temperature.

References Cited in the file of this patent

UNITED STATES PATENTS

| | | |
|---|---|---|
| 2,060,316 | Hoesel | Mar. 10, 1936 |
| 2,160,381 | Cruikshank | May 30, 1939 |
| 2,198,449 | Atkins | Apr. 23, 1940 |
| 2,223,287 | Kingsland | Nov. 26, 1940 |
| 2,292,335 | Durbin | Aug. 4, 1942 |
| 2,293,482 | Ambrose | Aug. 18, 1942 |
| 2,299,335 | McGrath | Oct. 20, 1942 |
| 2,332,730 | Kucher | Oct. 26, 1943 |
| 2,628,480 | Feinberg | Feb. 17, 1953 |
| 2,870,964 | Lindbom | Jan. 27, 1959 |
| 2,956,416 | Taylor | Oct. 18, 1960 |